Jan. 1, 1946.  A. C. RUGE  2,392,293
TORQUE MEASURING APPARATUS
Filed Feb. 14, 1942  5 Sheets-Sheet 1
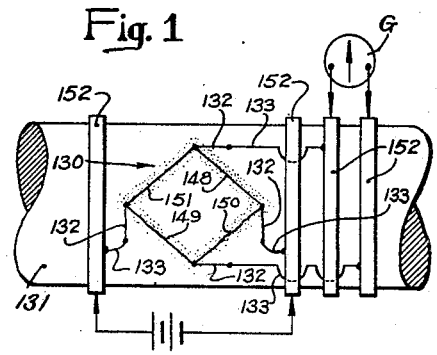
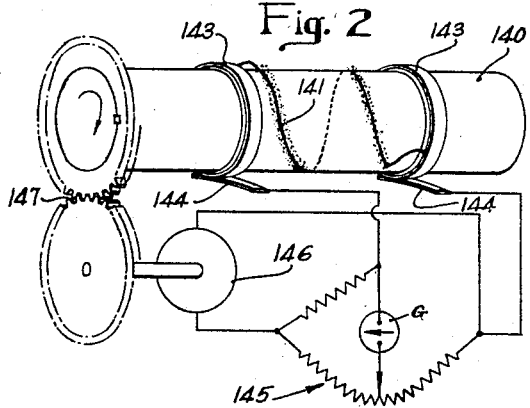
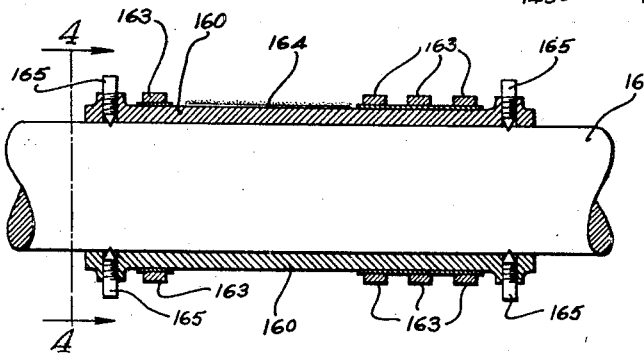
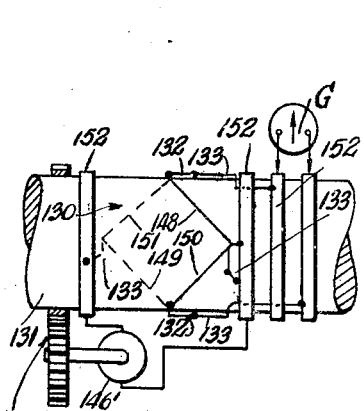
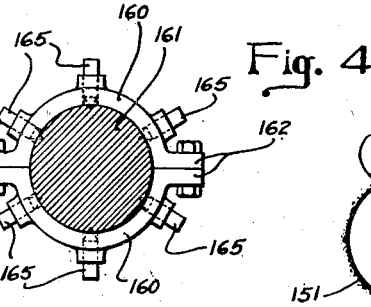
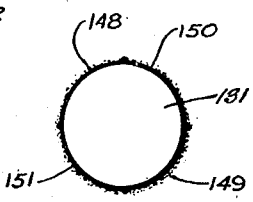
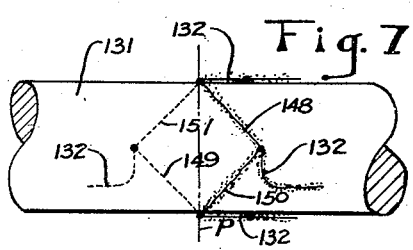
INVENTOR
ARTHUR C. RUGE
BY
ATTORNEY Jan. 1, 1946.　　　　　A. C. RUGE　　　　　2,392,293
TORQUE MEASURING APPARATUS
Filed Feb. 14, 1942　　　　5 Sheets-Sheet 2
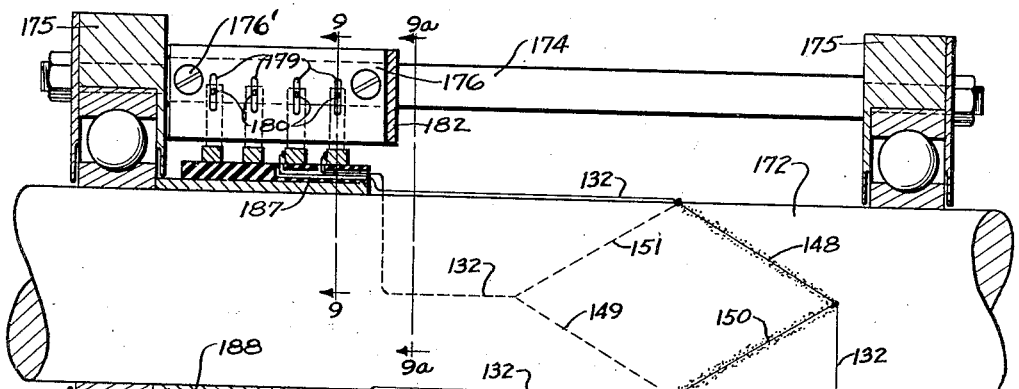
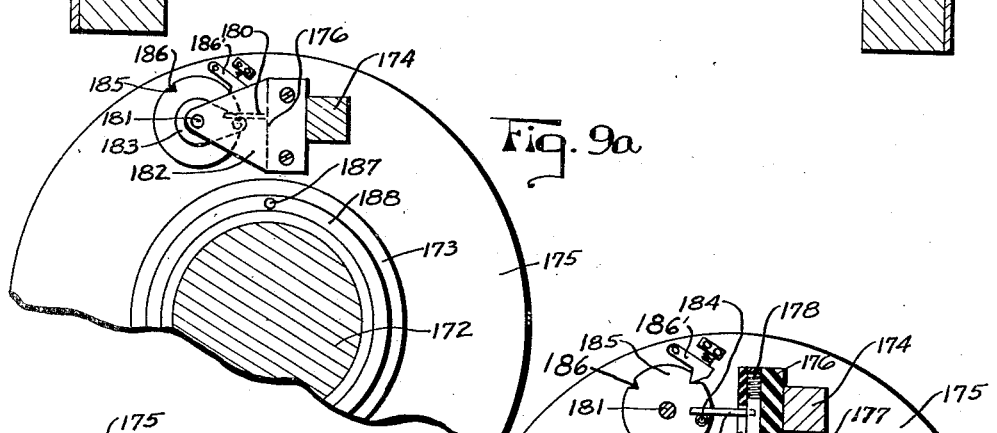
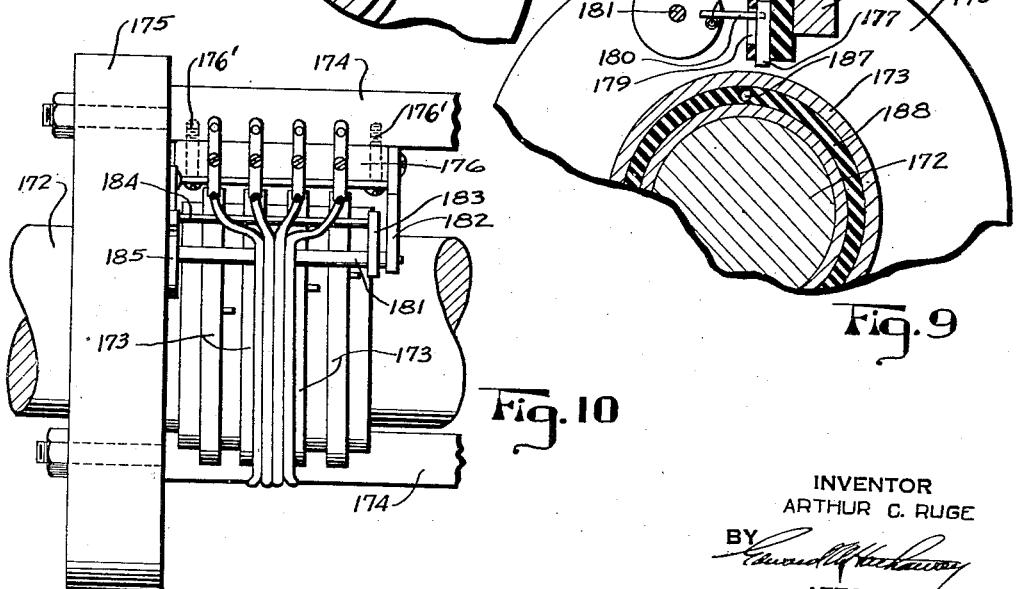
INVENTOR
ARTHUR C. RUGE
BY
ATTORNEY

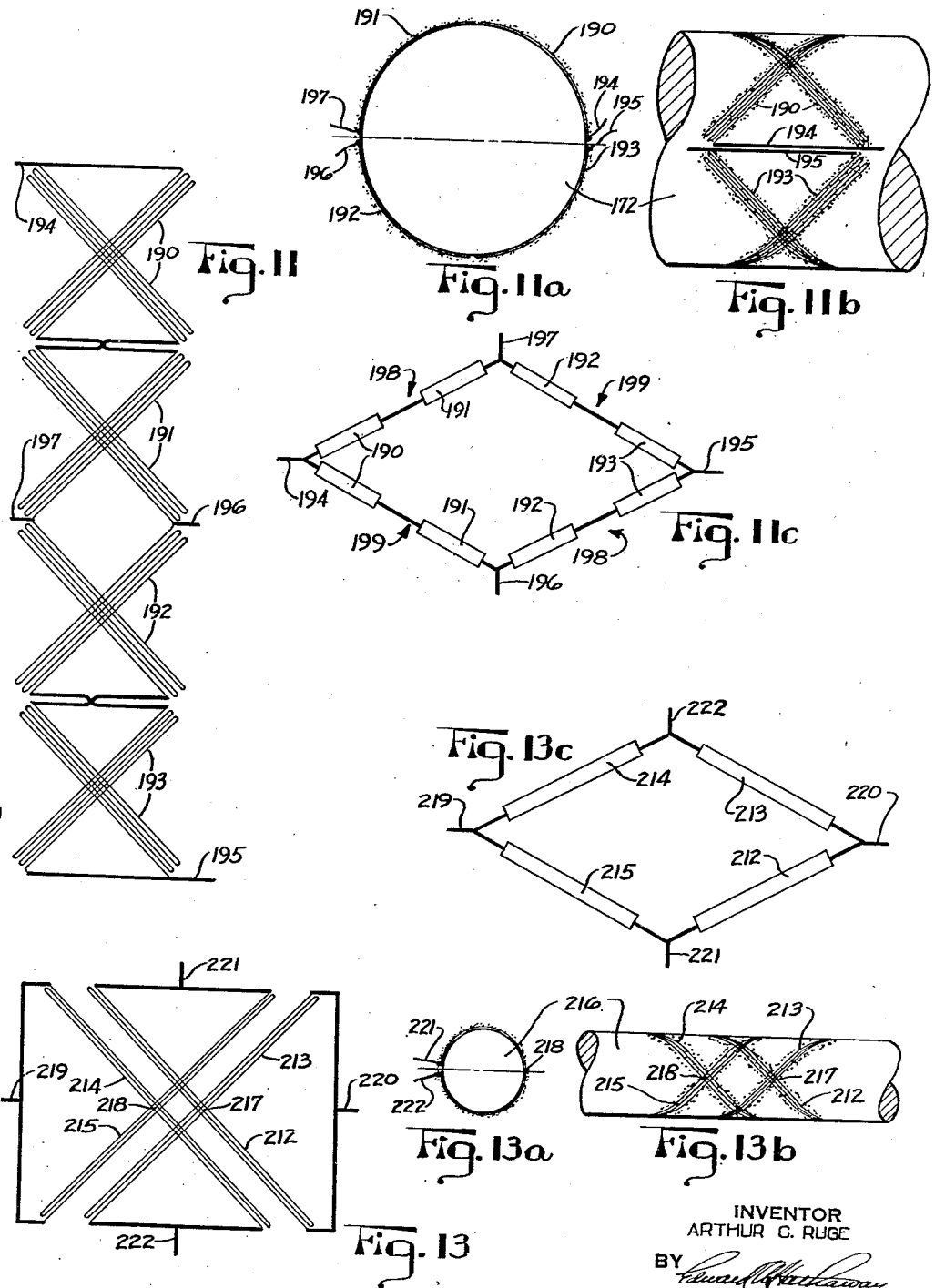

Jan. 1, 1946.            A. C. RUGE            2,392,293
                    TORQUE MEASURING APPARATUS
            Filed Feb. 14, 1942          5 Sheets-Sheet 4

INVENTOR
ARTHUR C. RUGE
BY
ATTORNEY

Jan. 1, 1946.   A. C. RUGE   2,392,293
TORQUE MEASURING APPARATUS
Filed Feb. 14, 1942   5 Sheets-Sheet 5
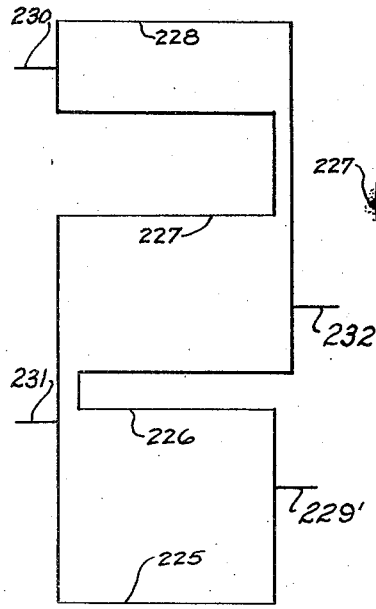
Fig. 14
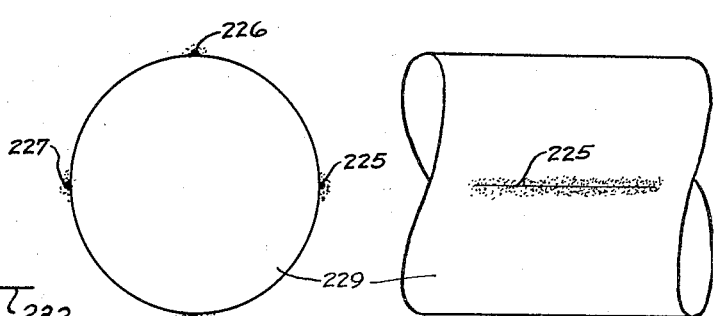
Fig. 14a   Fig. 14b
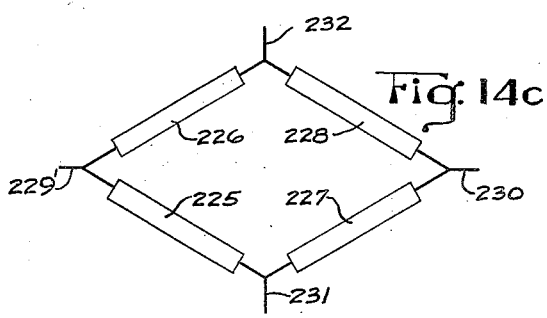
Fig. 14c
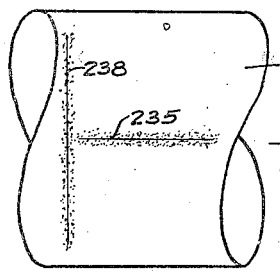
Fig. 15a
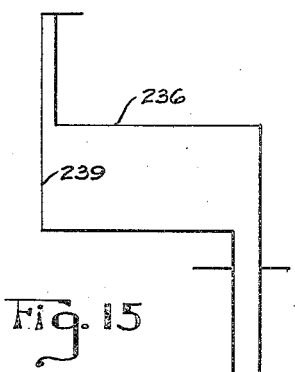
Fig. 15
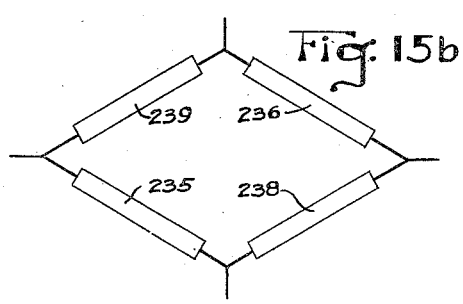
Fig. 15b
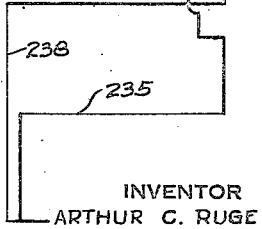
INVENTOR
ARTHUR C. RUGE
BY
ATTORNEY Patented Jan. 1, 1946

2,392,293

UNITED STATES PATENT OFFICE 2,392,293

TORQUE MEASURING APPARATUS

Arthur C. Ruge, Cambridge, Mass., assignor to The Baldwin Locomotive Works, a corporation of Pennsylvania Application February 14, 1942, Serial No. 430,921

14 Claims. (Cl. 73—136)

This invention relates generally to apparatus for measuring strain in rotating members and shafts and is especially applicable to the measurement of torque and power. This application is a continuation in part of my copending application Serial No. 295,207, filed September 16, 1939, now Patent 2,350,972, granted June 6, 1944.

Various arrangements have heretofore been proposed or used for measuring strain in rotating members such as airplane propellers and for measuring torque and power in rotatable shafts but such prior devices have been deficient in certain of their physical and functional aspects, such for instance as being too complicated, incapable or difficult of instantaneous reading, too costly, requiring too much space, or not being sufficiently accurate, sensitive, stable and rugged. The problem of measuring torque, or of measuring power which involves the factor of speed with torque, becomes more difficult with increasingly larger sizes of shafts and with very small size shafts through which the torque or power is transmitted and these difficulties are further aggravated where torsional vibration is present, such as in ship propeller shafts. Another difficulty is that the torque transmitted through a shaft may be accompanied by bending and longitudinal stresses as well as torsional vibration stresses. Under certain conditions it may be desirable to measure these various types of stresses alone.

In one specific aspect of my invention I employ an electrical strain sensitive filament of the type comprising a solid metallic wire of preferably round cross-section bonded throughout its effective length to a rotatable member or shaft subject to strain or to torsion. However, such rotatable elements require the use of slip rings for transmitting strain responsive current variations to indicating apparatus supported entirely independently of the shaft but one very serious difficulty in using slip rings is that the current variations in a strain sensitive filament of the bonded solid wire type are very small and hence the resistance offered by slip rings and brushes can be of sufficient magnitude to introduce great errors or distortions in the strain reading. A further difficulty is that temperature changes occurring around or in the rotating shaft or member will introduce errors into the strain indications if not fully compensated for.

One object of my invention is to provide improved apparatus for measuring strain in a rotating shaft or member and particularly for determining the torque as well as the horsepower during its transmission through a power shaft. Another object is to provide an improved meter for determining torque or strain in rotating shaft or member and which will not introduce errors arising from electrical resistance of slip rings and brushes. Still another object is to provide an improved torque or strain meter for rotating shafts and members that will not introduce errors arising from either slip ring resistance or temperature variations. A further object is to provide improved torque measuring apparatus that is not only sensitive and accurate but has a high degree of simplicity and physical and functional stability.

In one specific aspect of my invention I overcome the above mentioned and other difficulties, especially that of slip ring resistance, by providing the improved combination of a Wheatstone bridge mounted entirely on a shaft so as to be rotatable therewith and of having at least certain arms of said bridge formed of strain sensitive filaments, this improved combination being highly effective even though the number of slip rings and brushes are increased through mounting the entire Wheatstone bridge on the shaft. Notwithstanding that an increase in the number of slip rings, with its consequent increased resistance and possibilities of fluctuations of resistance, might appear to seriously aggravate this particular difficulty, yet for reasons more fully explained hereafter, I am able by this now seemingly simple combination to eliminate the possibility of errors through slip ring resistance and fluctuations therein during rotation of the shaft. Also by my improved combination, I am able to obtain the additional desirable result of providing effective and simple temperature compensation. Hence, without any increase of cost or complications my combination performs a multiplicity of functions.

Other objects and advantages will be more apparent to those skilled in the art from the following description of the accompanying drawings in which:

Fig. 1 is a torsion measuring apparatus embodying my invention as applied to a shaft adapted to have continuous rotation;

Fig. 2 is a diagrammatic illustration of a horsepower measuring device embodying my invention wherein the torque and speed of rotation of the shaft are coordinated;

Fig. 3 is a longitudinal section through a horsepower measuring apparatus in which the torque responsive equipment therefor is removably attachable to a shaft;

Fig. 4 is a transverse section taken on the line 4—4 of Fig. 3;

Fig. 5 is a horsepower meter with a bridge on the shaft as shown in Figs. 6 and 7;

Fig. 6 is an end view of Fig. 7 showing bridge arms in their circumferential symmetrical position;

Fig. 7 is a plan view of Fig. 6 to show that the bridge arms are also mounted symmetrically about a plane normal to the shaft axis;

Fig. 8 is a longitudinal section through a modified brush holder arrangement for the torque meter;

Figs. 9 and 9a are fragmentary sections taken substantially on the lines 9—9 and 9a—9a respectively of Fig. 8;

Fig. 10 is a partial plan view of the left end of Fig. 8;

Figs. 11 to 13c illustrate different forms of windings that are particularly applicable for measuring torsional strains under various conditions;

Figs. 14-14c illustrate my improved bending pick-up circuit;

Figs. 15 to 15b illustrate my improved thrust pick-up circuit; and

Figure 16:
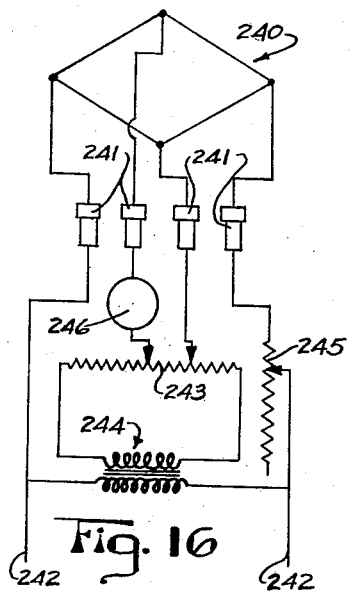
Figure 17:
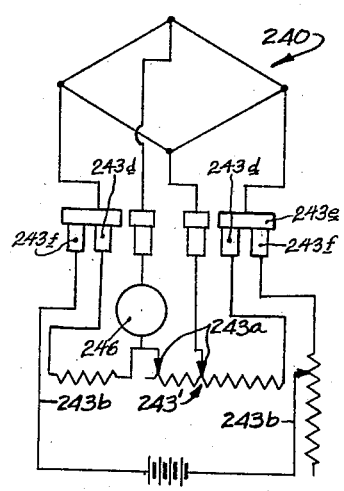

Figs. 16 and 17 illustrate two measuring circuits that are particularly adapted for cooperation with my rotatable Wheatstone bridge.

In Fig. 2 of the drawings, I have illustrated a horsepower meter involving the factors of torque and speed although in this form I do not compensate for slip ring resistance or temperature changes as is fully accomplished in Fig. 1 to be described later. A strain sensitive filament 141, Fig. 2, is placed on the surface of a shaft at an angle to the axis of rotation. The filament may either spiral around the shaft or, if desired, a short length will suffice or a series of short lengths at various points on the shaft may be employed. The filament is connected to a pair of slip rings 143 suitably insulated from and mounted on shaft 140 for rotation therewith. A pair of brushes 144 connect the two slip rings to a Wheatstone bridge generally indicated at 145, this bridge being supplied with voltage from a generator diagrammatically indicated at 146. The generator is driven directly from shaft 140 through any suitable mechanism such as gears 147 thereby producing a voltage directly proportional to the speed of the shaft. The generator may be either direct or alternating current. In operation, the shaft is subjected to torsion thereby placing the outside fibers of the shaft in a state of strain. At right angles to the axis the strain is in the nature of a shearing distortion and the same condition is true in the direction of the axis. At any angle between these two directions the fibers are in a state of extension or contraction, depending upon the direction of torsion and the direction of the fiber in question. The maximum strain of this kind in a circular shaft occurs at 45 degrees to the axis thereof. The strain filament 141 is therefore sensitive to the torque and will accordingly unbalance the bridge 145 in proportion to the torque. Inasmuch as the generator source of voltage for the bridge varies with and is directly proportional to the speed of the shaft, it is seen that the two components, speed and torque, necessary for determining horsepower are combined in the Wheatstone bridge so as to commonly act upon the galvanometer or other usual recording device to allow the power to be read or recorded directly. The apparatus may, of course, be calibrated and hence it is possible to use strain sensitive filaments arranged in any suitable manner such as using a filament reversed back and forth and in which the strands are placed on the shaft surface in the direction of the strain to be detected. As shown in my copending application, this reversal of strands allows a relatively great length of filament to be disposed over a short length of the shaft with the same efficiency as if a much longer section of shaft were used.

It is apparent that in the transmission of power, particularly from various types of prime movers, the temperature of the drive shaft may vary considerably and therefore temperature compensation is a vital and necessary factor in my improved horsepower meter. Such temperature compensation may be effected in any one of the various manners more fully disclosed in my said copending application. However, one particularly effective and simple arrangement for temperature compensation is shown in Fig. 1 wherein a bridge network 130 is placed entirely upon the shaft in which torque is to be measured, the network being so arranged as to form four arms of a Wheatstone bridge at least certain of the bridge arms constituting a continuously solid metallic wire filament whose electrical resistance varies with strain and which is diagonally disposed and bonded throughout its effective length to shaft 131 so as to be responsive to torsional strains therein. As specifically shown in Figs. 1 and 5, all four arms are formed by a filament of such type. Two filaments 148 and 149 are laid in such direction as to put them in tension when torsion is applied to the shaft, usually at 45 degrees to the shaft axis. The other two filaments 150 and 151 are laid so as to be in compression, usually at 90 degrees to the tension filaments. Hence the arms of the bridge are so connected as to be alternately in tension and compression around the circuit. The voltage is applied through the lead arms 133 and the torque is indicated on the galvanometer G or usual recording apparatus. Inasmuch as the wires are all put down over the same portion of the shaft they are all subject to the same temperatures and due to the symmetry of the bridge the effects of temperature would be completely balanced out.

Another advantage of my improved arrangement is that it permits the elimination of bending and longitudinal stress effects which usually occur in a shaft. When the networks of filaments as above described are installed so as to be symmetrical circumferentially, Fig. 6, about the shaft axis and also about a plane P, Fig. 7, normal to the shaft axis, then neither bending nor thrust stress will produce any unbalance in the bridge. Thus my improved arrangements are extremely advantageous from the standpoint of eliminating undesirable effects due to temperature and of all stresses other than those due to torsion.

In the above Wheatstone bridge arrangement all four filaments are connected together and hence may be used, as shown in Fig. 5, as a horsepower meter merely by allowing rotation of the shaft to drive a generator 146' through gears 147'. It is not necessary to introduce any contact resistance in the main bridge arms, the only contacts being four slip rings each numbered 152, Fig. 1, connecting the lead wires 133 with the galvanometer and source of voltage. In the arrangement shown in Fig. 1, the interposed filaments 132 will effectively eliminate the possibility of thermocurrents. It is well-known that any resistance in the leads connected to any one or all of the four corners of a bridge does not alter the balance point of the bridge and therefore by mounting the entire bridge on the shaft I am able to employ the foregoing principle with the result that the resistance of the slip rings is of no importance as regards the accuracy of the bridge. The only effect of the slip ring resistance is to decrease the sensitivity of the bridge. If the slip ring resistance is kept small compared to the resistance of the bridge arms, then the sensitivity is only slightly changed. To eliminate the possibility of thermocurrents all four arms of the Wheatstone bridge generally indicated at 130 are laid on the torsion specimen 131, each arm constituting a filament composed of a suitable material.

For purposes of illustration, Advance wire may be used as this has a high thermo-electric effect against copper. In order to connect this bridge to copper lead wires I first interposed a short length (about ¾″) of copper wire 132 (.002 inch in diameter) between each corner of the bridge and the series of copper lead wires 133 which are about .04 inch in diameter. The resulting circuit was free from any noticeable thermocurrents as explained in my Patent No. 2,334,843, even when any of the lead wires were purposely heated far more than they would be normally heated. The .002 inch copper wires added so little resistance that the bridge sensitivity was not measurably affected and by being outside the main bridge arms their strain sensitivity had no effect whatever on the filaments.

It is obvious that the horsepower measuring arrangements above described may be used equally as well as a simple torque measuring apparatus by merely employing a fixed voltage as shown in Fig. 1 in place of the variable voltage generator 146 of Fig. 2. By a simple throw-over switch either a battery or the generator 146 could be connected to the Wheatstone bridge thereby permitting the device to indicate either power or torque on the same meter or recording apparatus. Of course, if the power shaft operates at a constant speed, then the generator driven thereby may be used as a voltage source for obtaining the torque reading provided that the shaft is rotating when the torque is being measured.

The torque and power meter as herein described offers a simple, direct and accurate means of measuring power and torque. No calibration in the field is necessary, provided the modulus of elasticity of the shaft material is known sufficiently closely, since the sensitivity or scale of the galvanometer or recording device can be calculated from the known characteristics of the strain sensitive wire and the size and modulus of the shaft. However, when a known torque can be applied the calibration is extremely simple, a torque very much smaller than the full torque sufficing for accurate calibration. The generator voltage is, of course, very easily calibrated. No particular skill is required in the operation of the device, its operation and structure being far simpler and its cost far less than any combination of elements capable of giving the desired measurement of comparable accuracy. Instantaneous power output may be recorded, if desired, or momentary fluctuations may be averaged out by employing a slow moving recorder.

The horsepower meter arrangements may have the strain gauges and slip rings permanently formed on a section of shaft which may be pre-calibrated and be removably inserted into a power shaft or the strain responsive equipment and slip rings may be built in place on the power shaft as it stands. However, if desired, the apparatus can be made for portable service by providing, as shown in Figs. 3 and 4, a split sleeve 160 suitably clamped to a power shaft 161 by longitudinally split bolted flanges 162. The slip rings 163 are permanently formed and insulated from the respective halves of the split clamp while the strain sensitive filaments diagrammatically illustrated at 164 can be permanently arranged and mounted on the two halves of the split clamp. The removable clamp can be pre-calibrated and then temporarily placed upon power shafts in the field. To insure proper stressing of the clamp or torque shell 160 suitable gauge points 165 may be suitably circumferentially spaced around opposite ends of the shell thereby insuring accurate torsion of the shell in response to the shaft torsion. The longitudinal spacing of the gauge points 165 will also insure that a predetermined gauge length of the power shaft will be utilized regardless of how often the torque power measuring apparatus may be removed and applied to different power shafts. If desired, one torque shell may be adapted for power shafts of different diameters merely by inserting spacing sleeves between the shell and shaft, or by having the torque shell uniformly radially spaced from a small power shaft but suitably secured thereto by screwing gauge points 165 into engagement with the shaft.

Materials of which the filament may be made, as well as the bonding cement and insulation are the same as shown in my above mentioned co-pending application, Serial No. 295,207.

Fig. 8 illustrates the application of the bridge of Fig. 7 to a mechanical structure for a torque meter consisting of a pair of ball bearings 170 and 171 mounted upon a shaft 172 whose torque is to be measured. A series of four slip rings 173 are suitably mounted on and insulated from said shaft while brushes are mounted upon a suitable stationary frame work consisting of a bar 174 supported in a casing 175 suitably held against rotation and enclosing the ball bearings. A brush container 176, Fig. 9, is suitably secured as by screws 176′ to rod 174, this brush holder having a series of four pockets, one for each brush 177 which are movable preferably radially with respect to the shaft axis. Suitable brush springs 178 bias the brushes to their contact position with slip rings 173. A series of four slots 179 extend laterally from the brush recesses so that pins 180 may be cemented into suitable openings in the various brushes. In case the torque meter is not to be used for an appreciable period of time, it is desirable to lift the brushes away from contact with the slip rings. To do this a shaft 181 journalled at its opposite ends in bearing casing 175 and in an end bracket 182, Fig. 8, has an arm 183 fixed thereto. A rod 184 is secured to and extends between disc 183 and a suitable disc 185, Fig. 10, the latter also being secured to shaft 181 for rotation therewith. Rod 184 is adapted when rotated in a counterclockwise direction to simultaneously engage and raise all brush pins 180. When the brushes are lifted a pawl 186′, Fig. 9, and recess 186 hold the brushes in their raised position. Clockwise rotation of disc 185 will allow the rod 184 to lower the brushes into contact with the slip ring and rod 184 will be prevented from vibrating or otherwise moving back into engagement with pin 180 due to pawl 186′ engaging another recess 186 in disc 183. The electrical strain sensitive filament, whether used alone as in Fig. 2 or used in the preferred arrangements of Figs. 1 and 7 wherein the entire Wheatstone bridge is formed on the shaft, is connected to the several slip rings by leads extending along the surface of the shaft and then through an opening 187 in an annular ring of insulation 188 beneath the slip rings.

The torque pick-up filament arrangement of Figs. 11-11c permits the filament torque pick-up to be confined to a short distance along the shaft axis while at the same time allowing a fairly long length of strain gauge wire in order to get sufficient resistance into the bridge arms. This arrangement has been specifically used on a shaft about 1¾" diameter and each arm of the bridge had a resistance of about 350 ohms as shown in the developed view of Fig. 11. The bridge includes two filament windings 190, one winding in each arm, crossed at right angles to each other as shown in Fig. 11, and each winding preferably having two or more reversely extending filament strands laid on the shaft surface at 45 degrees to the shaft axis. These two windings are, in turn, connected in series with successive sets of similar pairs of filament windings 191, 192, 193. The sets 190—193 are respectively located in successive quadrants around the circumference of the shaft as shown in Figs. 11a and 11b. The sets of filaments when connected in the manner shown in Fig. 11 establish a Wheatstone bridge as shown in Fig. 11c, the voltage for the bridge being impressed thereon through leads 194 and 195 while the unbalance of the bridge is measured either by a galvanometer or oscillograph through leads 196 and 197. The leads 194—197 are connected respectively to the slip rings 173, Fig. 8. Each pair of windings such as 190 is divided, one winding being in one bridge arm and the other winding being in the adjacent bridge arm and similarly for the remaining pairs of windings. As a result of this arrangement the resistance change is twice as great as that which would be obtained with only a single filament. A higher degree of sensitivity is obtained for the reason that one filament, say 190, is in tension during transmission of torque through shaft 172 while the other right angle filament 190 is in compression, that is, the resistance change per unit of strain is twice as great as the change that would take place with a single filament operating either in only compression or only in tension. The compression-tension relation is inherent in the fibre stress of a torque shaft and my improved arrangement takes advantage of this to obtain the higher degree of sensitivity. Similarly, the two windings for each additional set of filaments are placed in the Wheatstone bridge so that all of the filaments in opposite arms generally indicated at 198, Fig. 11c, are in compression while all of the filaments in the other opposite arms generally indicated at 199 are in tension. Hence, in response to a torsional strain the resistance of arms 199 will increase while the resistance of arms 198 will decrease. Thus a high degree of sensitivity is obtained in a comparatively short distance along the shaft.

Figure 12:
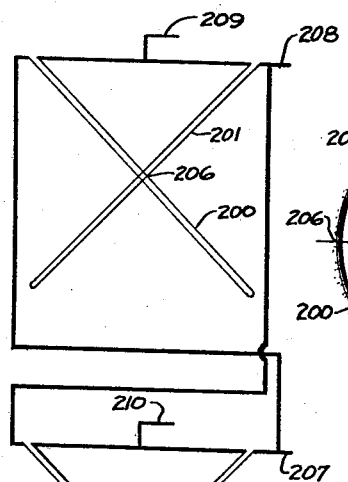
Figures 12A, 12B:
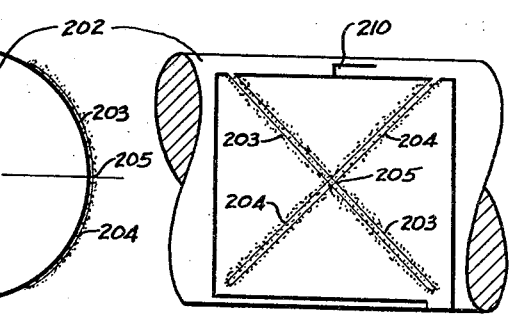
Figure 12C:
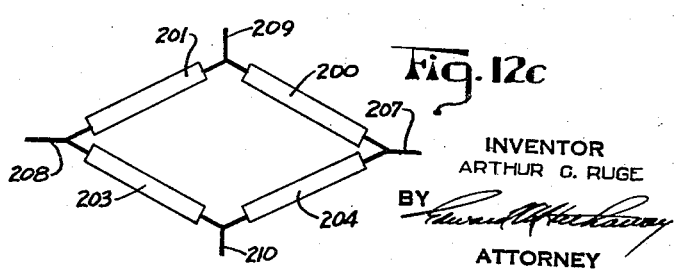

In the pick-up arrangement of Figs. 12 to 12c a double X construction is employed, one filament winding 200 being crossed over a filament winding 201. These two windings are bonded symmetrically within a semi-circular segment on a shaft 202. Another pair of crossed filament windings 203 and 204 are similarly bonded symmetrically on the shaft in its other semi-circular segment, the points of cross-over 205 and 206 being diametrically opposed. The two pairs of windings 200, 201 and 203, 204 are therefore symmetrically arranged both circumferentially and axially. Bending and thrust forces are therefore eliminated. The length of the windings depends upon the amount of resistance desired. Each pair of windings may, if necessary, be long enough to extend completely over one half of the circumference or if less resistance is required the windings will extend only partially over the circumference as shown in Fig. 12b. The pairs of windings are connected together as shown in Fig. 12 to form a Wheatstone bridge having external voltage leads 207 and 208 while the unbalance of the bridge is measured across leads 209 and 210. The filament arrangement is such that when windings 203 and 200 are in compression then windings 201 and 204 are in tension. This insures a high degree of sensitivity of the pick-up circuit as is illustrated in the bridge of Fig. 12c.

In the pick-up arrangement of Figs. 13 to 13c the double X principle above described is employed but with the additional feature that the two pairs of windings are, in turn, crossed over each other. For instance, the windings 212 and 213 cross over each other and a second pair of windings 214 and 215 not only cross over each other but also over the other windings. These windings extend completely around the circumference of a shaft 216 with the points of cross-over 217 and 218 being located on a common line as shown in Fig. 13b. The windings are connected together to form a Wheatstone bridge upon which voltage is impressed through leads 219 and 220 while unbalance of the bridge is measured across leads 221 and 222. The windings are connected together as shown in Fig. 13c so that they have the same relationship as the windings shown in Wheatstone bridge of Fig. 12c, the windings 212 and 214 being in tension when the windings 213 and 215 are in compression, or vice versa. This arrangement is particularly useful for a small shaft, say ⅝ of an inch in diameter, on which it may be desired to have a considerable length of wire bonded over a reasonable length of shaft. While any of the designs previously shown could be used on a small shaft, yet they would be considerably more difficult to apply. In Figs. 11 to 15c the leads and wires for connecting the filaments are shown in heavy lines and the filaments in lighter lines.

None of the designs shown are limited by the absolute size of shaft so that the design chosen in any particular case depends largely upon the considerations of convenience and accuracy in laying down the wires and upon the length of shaft available. The arrangements of Figs. 7, 8 and 11 to 13c have the basic twofold symmetry necessary to eliminate bending and thrust from the torque reading or from a horsepower reading if voltage is impressed upon the rotating bridge in proportion to the shaft speed, for example, by substituting generator 146 for a battery. The resistance changes due to bending and thrust will always be cancelled out in the bridge circuit and only strains due to torque will appear. It is, of course, understood that the filaments in all of the pick-up arrangements are bonded throughout their effective length to the shaft surface either directly by using the bonding cement as electrical insulation or by employing an equivalent arrangement wherein a thin piece of paper membrane is interposed between the shaft surface and the filament. Wherever the strain filaments cross each other they are suitably insulated by paper or by the bonding cement.

If it is desired not to measure torque but measure only thrust or only bending, then various filament arrangements may be used, the arrangements of Figs. 14 and 15 being illustrative of the principle involved in the selection of one particular type of strain out of possible others. To measure bending alone, the arrangement of Figs. 14 to 14c are employed wherein a plurality of filaments, specifically four in number 225, 226, 227 and 228, are bonded to the surface of a shaft 229 in an axial direction and are circumferentially spaced 90 degrees from each other. The filaments 225 to 228 form a Wheatstone bridge in which the filaments on opposite sides of the shaft at 180 degrees from each other, such as 226 and 228, are connected on one side of the bridge so that when filament 226 is in tension and filament 228 is in compression, due to bending of the shaft, then the resistance of filament 226 is increased and the resistance of filament 228 is decreased thereby causing the resistances of these two arms to be cumulative in their effects upon the balance of the bridge when bending is applied to the shaft. During this instant the arms 225 and 227 lie in the plane of the neutral axis of the shaft and hence are not subject to either tension or compression and accordingly their resistance does not change. When the shaft rotates 90 degrees then the filaments 225 and 227 are subjected to tension and compression respectively and therefore the other side of the bridge will be unbalanced and the resistances 225 and 227 will be cumulative. Voltage may be impressed upon the bridge at leads 229' and 230 while a galvanometer, oscillograph or other indicating apparatus may be connected across the bridge at leads 231 and 232. Any torsional strain will not have an appreciable effect upon the axially disposed filaments 225—228. The leads 229'—232 will be connected to slip rings as previously described. Further, thrust strain will have no effect upon the balance of the bridge since all arms would be equally affected thereby.

To measure thrust alone, I have shown in Fig. 15 two axially extending electrical strain sensitive wire filaments 235 and 236 positioned on a shaft 237, 180 degrees apart. Also, a pair of filaments 238 and 239 are positioned on the shaft respectively at right angles to the filaments 235 and 236. All of these filaments are connected together as shown in Fig. 15b to form a Wheatstone bridge mounted entirely upon and rotatable with the shaft. The purpose of this circuit is to measure thrust alone with the elimination of any appreciable bending effect within the range of operation of such a device. In explaining the operation it may, for simplicity, first be assumed that filaments 238 and 239 do not undergo any change in resistance due to either bending or thrust strains and that, on the other hand, a bending strain will cause resistances 235 and 236 to be increased and decreased respectively by equal amounts, or vice versa depending upon which filaments are in compression or tension during bending. This equal increase and decrease of resistance will not, for all practical purposes, unbalance the bridge and hence bending strains are eliminated. However, when the shaft is subjected to thrust the resistance of filaments 235 and 236 will be decreased equally thus effecting a very substantial unbalance of the bridge. The reason why the balance of the bridge is not materially affected by bending is because the resistance changes with which a device of this kind is dealing are very small. For sake of illustration it may be assumed that each arm initially has 100 ohms so that if the shaft bends to increase the resistance of filament 236 to $(100+0.100)$ ohms and filament 235 is decreased to $(100-0.100)$ ohms (filaments 238 and 239 assumed to be unchanged), then the product of resistances 235 and 236 is $$(100+0.100) \times (100-0.100) = 10,000 \times (0.999999)$$

The foregoing shows that the bridge is substantially balanced despite the bending. On the other hand, when the same degree of strain variation acts on the bridge in response to thrust (still assuming 238 and 239 to remain unchanged), then the unbalance of the bridge is the product of gauge resistance 235 and $236 =$ $$(100+0.100) \times (100+0.100) = 10,000 \times (1.002001)$$

Therefore the assumed stress created by bending has only $\frac{1}{2000}$ of the effect on the bridge balance as has the same stress in thrust. Further, the same reasoning shows that any effects of bending upon filaments 238 and 239 (previously assumed to be unchanged) will cancel out in the same manner if the shaft is subject to bending about an axis at right angles to filaments 238 and 239, then these arms will undergo resistance changes as well as arms 235 and 236 but the changes will cancel out in the same manner as above described because one goes up and one goes down in resistance. Also the filaments 238 and 239 eliminate a substantial part of the $\frac{1}{2000}$ error referred to above.

The measuring circuits of Figs. 16 and 17 are particularly adapted for measurement with the rotatable strain pick-up bridge. The rotating bridge diagrammatically indicated at 240 may be considered to be any one of the various filament arrangements disclosed herein provided that they are of the type mounted entirely upon the rotating shaft. The bridge is connected through a series of brush and slip rings diagrammatically indicated at 241 to a source of alternating current 242 and a bridge balancer resistance 243 is supplied with current through a transformer 244 while a sensitivity adjusting resistance 245 is provided in the circuit for adjusting the voltage on the bridge 240. The principle involved in the balancer circuit is that a voltage may be selected which exactly cancels the unbalanced voltage of the bridge and readings of the balancing voltage may be taken from usual graduations on the potentiometer. A galvanometer or other suitable indicating means 246 may be inserted in the circuit across the bridge. The arrangement of Fig. 16 is particularly effective because the balancing voltage is supplied through transformer 244 from the same line that feeds the bridge and therefore the bridge voltage and balancing voltage always go up and down together regardless of changes in line voltage which supplies the whole device.

The measuring circuit of Fig. 17 is related broadly to the A. C. circuit of Fig. 16 except that in Fig. 17 a D. C. voltage is supplied to both the bridge and the balancer 243' from a common battery. The voltage for the balancing circuit is obtained through a set of auxiliary brushes 243d which contact the same slip rings 243e through which battery voltage is impressed upon the bridge by a separate set of brushes 243f. By adjusting the contacts 243a the bridge unbalance may be determined. In this arrangement the bridge balancing method does not depend upon the battery holding its voltage constant. In this respect it is broadly like the A. C. circuit of Fig. 16 which is independent of voltage variations on the line 242. In operation, a current of considerable magnitude flows through brushes 243f to feed the bridge; this current might be 60 or more milliamperes. Now if there is a resistance at brushes 243f of, say 1 ohm, there would be a very considerable voltage drop across the brush to the slip ring connection, and if the two brushes 243f have different resistances these voltage drops are large enough to cause measurable errors in the reading. As an example, in a well built system one might find maximum errors of as much as 1 percent due to this effect. If the bridge 240 were not mounted entirely upon the shaft so as to form a closed loop rotating therewith, then the slip ring resistance would cause a still greater error, in fact, the error might be of the order of 100 or 1000 times as much. Thus it is seen that my fundamental concept of placing the bridge entirely upon the shaft accomplishes the result of minimizing the effect of slip ring resistance. To further minimize any possible error arising in the type of measuring circuit just mentioned, I can employ auxiliary brushes 243d for the balancing circuit and these brushes "see" the voltage actually on the slip ring rather than the voltage on the wiring leading to brush 243f. Thus, because the resistance of the balancing circuit is very great and practically no current flows through auxiliary brushes 243d, no appreciable voltage drop occurs across them.

It is further understood that the filaments in all arrangements are bonded throughout their effective length in the manner disclosed in my copending application Serial No. 295,207, filed September 16, 1939.

It will of course be understood that various changes in details of construction and arrangement of parts may be made by those skilled in the art without departing from the spirit of the invention as set forth in the appended claims.

I claim:

1. In combination, strain gauge for determining the torsional strain of a member comprising a filament of material whose electrical resistance varies with its strain and which extends diagonally of and is secured throughout its effective length to said member, a second filament of material whose electrical resistance varies with its strain and which extends substantially in a different direction from that of said other filament and is secured throughout its effective length to said member, and means including said filaments adapted to be responsive to the relative resistances of said filaments so as to compensate for temperature changes in said filaments and thereby cause said means to be responsive only to torsional strain variations in said member.

2. In combination, strain gauge for determining the torsional strain of a member comprising a filament of material having strain sensitivity extending diagonally of and secured throughout its effective length to said member, an electrical bridge circuit in which said filament constitutes one arm, and a source of voltage for said bridge directly responsive to rotation of said member about its torsional axis whereby said bridge is responsive to power transmitted through said member.

3. In combination, a strain gauge for determining the torsional strain of a rotatable member comprising a filament of material having electrical strain sensitivity extending diagonally of and secured throughout its effective length to said member, means responsive to the speed of rotation, and means for correlating the strain of said filament and the speed of rotation of said member so as to obtain the power transmitted through said rotatable member.

4. In combination, a strain gage responsive to the torsional strain of a rotatable shaft comprising a filament of material whose electrical resistance varies with its strain and which extends diagonally of and is secured throughout its effective length to said shaft, an electrical bridge circuit having at least one arm formed by said strain responsive filament, and means for impressing a voltage upon said circuit proportional to the speed of rotation of said shaft thereby to cause said circuit to be responsive to the power transmitted through said shaft.

5. In combination, a strain gage responsive to the torsional strain of a rotatable shaft comprising a filament of material whose electrical resistance varies with its strain and which extends diagonally of and is secured throughout its effective length to said shaft, an electrical bridge circuit having at least one arm formed by said strain responsive filament, means for impressing a voltage upon said circuit proportional to the speed of rotation of said shaft thereby to cause said circuit to be responsive to the power transmitted through said shaft, and means for compensating for variations in strain arising from temperature changes.

6. In combination, a rotatable member, a Wheatstone bridge mounted entirely upon said member for rotation therewith and at least one arm of said bridge constituting a filament of material bonded throughout its effective length to said member and whose electrical resistance varies with the strain of said member, and slip rings connected to said bridge and mounted on said member for rotation therewith, whereby the unbalance of said bridge in response to strain may be determined through said slip rings.

7. In combination, a torque meter comprising a shaft having a Wheatstone bridge with all four of its arms mounted on the shaft to constitute a closed circuit rotatable with the shaft, at least certain of said arms constituting electrical filaments of material bonded throughout their effective length to said shaft and whose electrical resistance varies with the torsional strain in said shaft, and slip rings rotatable with said shaft and connected to the four corners of the bridge so as to impress voltage upon two corners of the bridge and to connect an indicating means to the other two corners of the bridge to determine the unbalance in said bridge arising from torsional strain in the shaft.

8. In combination, a shaft having a Wheatstone bridge with all four arms thereof mounted on said shaft to rotate therewith, at least certain of said bridge arms constituting a continuous solid metallic wire filament whose electrical resistance varies with strain and which is bonded throughout its effective length to said shaft so as to be responsive to torsional strains therein, and slip rings mounted on said shaft for rotation therewith so as to impress a voltage upon said bridge and to determine unbalance thereof in response to torsional strain in the shaft.

9. In combination, a shaft having a Wheatstone bridge mounted entirely thereon for rotation therewith, the four arms of said bridge each comprising a continuous solid wire filament whose electrical resistance varies with strain and which is bonded throughout its effective length to said shaft so as to compensate for temperature changes and be responsive to torsional strains therein, and slip rings mounted on said shaft for rotation therewith and connected to the four corners of said Wheatstone bridge to impress a voltage thereon and obtain an indication of the bridge unbalance in response to torsional strain in the shaft.

10. In combination, a shaft having a Wheatstone bridge in which all four arms constitute a closed circuit mounted entirely on said shaft for rotation therewith, said arms being formed of electrical strain sensitive elements placed diagonally upon said shaft to be responsive to torsional strain therein and said arms being arranged symmetrically on said shaft both circumferentially and with respect to a plane normal to the shaft axis, whereby bending effects within said shaft are substantially eliminated so that the bridge is responsive solely to torsional strain in the shaft.

11. In combination, a shaft having a Wheatstone bridge in which all four arms constitute a closed circuit mounted entirely on said shaft for rotation therewith, said arms being formed of electrical strain sensitive elements placed diagonally upon said shaft to be responsive to torsional strain therein and said arms being arranged symmetrically on said shaft both circumferentially and with respect to a plane normal to the shaft axis, whereby bending effects within said shaft are substantially eliminated so that the bridge is responsive solely to torsional strain in the shaft, two of said bridge arms being disposed on top of said shaft and the other two arms being disposed on the underside of said shaft, and bridge rings mounted on said shaft for rotation therewith and connected to the four corners of the bridge to allow voltage to be impressed on the bridge and unbalance thereof to be determined.

12. In combination, a rotatable member subject to bending during its rotation, a Wheatstone bridge mounted entirely upon said member for rotation therewith and at least certain of the arms of said bridge constituting an electrical resistance element whose resistance varies with strain of said member, said resistance element extending in the direction of bending strain in said member so as to be responsive to bending, and slip rings connected to said bridge and mounted on said member for rotation therewith, whereby the unbalance of the bridge in response to bending strain may be determined through said slip rings whose brush contact resistance is external of the bridge.

13. In combination, a rotatable member subject to a thrust strain and to other possible strains, a Wheatstone bridge mounted entirely upon said member for rotation therewith and at least one arm of said bridge constituting an electrical resistance element whose resistance varies with the thrust strain of said member and the arms of said bridge being arranged so that unbalance of the bridge occurs only in response to said thrust strain, and slip rings connected to said bridge and mounted for rotation therewith whereby unbalance of the bridge in response to thrust may be determined through said slip rings whose brush contact resistance is external of the bridge.

14. In combination, a rotatable member subject to a plurality of different kinds of strain, one of which it is desired to measure independently of any other, a Wheatstone bridge mounted entirely upon said member for rotation therewith and a plurality of arms of said bridge constituting filaments of material whose electrical resistance varies with the strain desired to be measured and the filament arms of said bridge being bonded throughout their effective length to said rotatable member and also being arranged on said member so that undesired strain is substantially balanced out within the bridge itself thereby allowing the bridge to be unbalanced substantially only by the strain desired to be measured, and slip rings connected to said bridge and mounted for rotation therewith whereby unbalance of the bridge in response to the desired strain to be measured may be determined through said slip rings whose brush contact resistance is external of the bridge.

ARTHUR C. RUGE.